US010032247B2

(12) United States Patent
Zhou

(10) Patent No.: US 10,032,247 B2
(45) **Date of Patent: *Jul. 24, 2018**

(54) SYSTEM AND METHOD FOR SPEEDING UP GENERAL MATRIX-VECTOR MULTIPLICATION ON GPU

(71) Applicant: Palo Alto Research Center Incorporated, Palo Alto, CA (US)

(72) Inventor: Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/190,073

(22) Filed: Jun. 22, 2016

(65) Prior Publication Data

US 2017/0372447 A1 Dec. 28, 2017

(51) Int. Cl.
*G09G 5/39* (2006.01)
*G06T 1/60* (2006.01)

(52) U.S. Cl.
CPC ..................................... *G06T 1/60* (2013.01)

(58) Field of Classification Search
CPC .......... G09G 5/393; G09G 5/39; G09G 5/363; G09G 5/395; G06T 1/60
USPC .......................................................... 345/531
See application file for complete search history.

(56) References Cited

PUBLICATIONS

Rajib Nath, Stanimire Tomov, and Tingxing “Tim” Dong. “Optimizing Symmetric Dense Matrix-Vector Multiplication on GPUs” [online], Nov. 12, 2011, [retrieved on Dec. 17, 2017]. Retrieved from the Internet: <URL: http://cseweb.ucsd.edu/~rknath/sc11.pdf>.*

Castellon. “Matrix Computations on Graphics Processors and Clusters of GPUs” [online], May 2011, [retrieved on Dec. 17, 2017]. Retrieved from the Internet: <URL: http://www.cs.utexas.edu/users/flame/pubs/FranDissertation.pdf>.*

* cited by examiner

*Primary Examiner* — Ke Xiao
*Assistant Examiner* — Gordon Liu
(74) *Attorney, Agent, or Firm* — Shun Yao; Park, Vaughan, Fleming, Dowler LLP

(57) ABSTRACT

A method and system for performing general matrix-vector multiplication (GEMV) operations on a graphics processor unit (GPU) using Smart kernels. During operation, the system may generate a set of kernels that includes at least one of a variable-N GEMV kernel and a constant-N GEMV kernel. A constant-N GEMV kernel performs computations for matrix and vector combinations with a specific value of N (e.g., the number of columns in a matrix and the number of rows in a vector). Variable-N GEMV kernels may perform computations for all values of N. The system may also generate 1B1R kernels, constant-N variable-rows GEMV kernels, and variable-N variable-rows GEMV kernels. The system may generate constant-N variable-threads GEMV kernels, and variable-N variable-threads GEMV kernels. The system may also generate variable-threads-rows GEMV kernels for the set. This may include ConstN kernels (e.g., constant-N variable-threads-rows GEMV kernels), and VarN kernels (e.g., variable-N variable-threads-rows GEMV kernels).

20 Claims, 14 Drawing Sheets

200

```
α ← α_test , β ← β_test                     /* init α, β to be used in y = αAx + βy GEMV tests */
Rules ← ∅                                   /* Rules: a set of rules for picking the best GEMV kernel */
foreach ⟨M, N⟩ in MN_test                   /* loop over MN_test, the set of ⟨M, N⟩ test pairs */
  A.init(M, N), x.init(N), y.init(M)        /* init matrix A, vectors x, y based on M and N */
  FLOPS_max ← 0                             /* FLOPS: floating point operations per second */
  f* ← nil /* f*: best kernel for the current test pair */
  foreach f in F_GEMV /* loop over F_GEMV, the set of GEMV kernel functions */
    if f.type ≠ ConstN or f.N = N then /* make sure kernel f can handle N */
    δ_t ← f.δ_t                             /* f.δ_t: thread-factor of kernel f */
    TB_t ← 16 × δ_t                         /* TB_t: # of threads per thread block */
    if f.type = 1B1R then                   /* is this a 1B1R variable-thread GEMV kernel?*/
      TB_r ← 1                              /* TB_r: # of rows of A per thread block */
    else
      δ_r ← f.δ_r                           /* f.δ_r: row-factor of kernel f */
      TB_r ← 16 × δ_r × δ_t                 /* TB_r: # of rows of A per thread block */
    end if
    grid.x ← ⌈M / TB_r⌉                     /* grid.x: # of thread blocks in 1st dim of grid */
    if grid.x ≤ MAX_GRID_DIM_X then         /* 1st dim of grid big enough? */
      grid.y ← 1                            /* no need to use 2nd dim of grid */
    else
      grid.y ← ⌈grid.x / MAX_GRID_DIM_X⌉ /* use 2nd dim of grid */
      grid.x ← MAX_GRID_DIM_X   /* assuming two dims are big enough for ⌈M / TB_r⌉ */
    end if
    FLOPS ← f⟨⟨⟨grid, TB_t⟩⟩⟩(y, A, x, M, N, α, β) /* launch GEMV kernel, get its speed */
    if FLOPS > FLOPS_max then               /* better than the best kernel found so far? */
      FLOPS_max ← FLOPS                     /* update FLOPS_max, the incumbent speed record */
      f* ← f                                /* mark f as the best kernel so far for current test pair */
    end if
  end if
end for
Rules.add("M, N → f*")                      /* add a rule that uses f* to process ⟨M, N⟩ pair */
end for
Rules.output()                              /* output the rules in terms of ⟨M, N, f*⟩ triples */
```

Pseudocode for Smart GEMV testing

FIG. 2

TABLE 3

Performance of GEMV kernels in GFLOPS for $M = 10^6$ and $N \in [2, 48]$

| *N* | *MAGMA* | *cuBLAS* | *1B1R* | *ConstN* | *VarN* | *Smart* | Smart / MAGMA | Smart / cuBLAS |
|---|---|---|---|---|---|---|---|---|
| 2 | 0.27 | 1.14 | 0.50 | **56.55** | 15.96 | 56.55 | 209x | 49.6x |
| 3 | 0.40 | 1.71 | 0.66 | **61.12** | 21.16 | 61.12 | 153x | 35.7x |
| 4 | 0.54 | 2.28 | 0.82 | **63.74** | 25.64 | 63.74 | 118x | 28.0x |
| 5 | 0.67 | 2.85 | 0.99 | **61.53** | 30.54 | 61.53 | 91.8x | 21.6x |
| 6 | 0.81 | 3.42 | 1.15 | **60.85** | 34.75 | 60.85 | 75.1x | 17.8x |
| 7 | 0.94 | 3.99 | 1.31 | **58.15** | 39.22 | 58.15 | 61.9x | 14.6x |
| 8 | 1.08 | 4.56 | 1.48 | **64.53** | 42.65 | 64.53 | 59.8x | 14.2x |
| 9 | 1.21 | 5.13 | 1.63 | **64.73** | 46.73 | 64.73 | 53.5x | 12.6x |
| 10 | 1.34 | 5.71 | 1.80 | **58.96** | 49.88 | 58.96 | 44.0x | 10.3x |
| 11 | 1.48 | 6.26 | 1.95 | **60.46** | 53.35 | 60.46 | 40.9x | 9.7x |
| 12 | 1.61 | 6.83 | 2.12 | **68.41** | 56.42 | 68.41 | 42.5x | 10.0x |
| 13 | 1.75 | 7.40 | 2.28 | **66.16** | 59.68 | 66.16 | 37.8x | 8.9x |
| 14 | 1.88 | 7.97 | 2.44 | **61.59** | 61.47 | 61.59 | 32.8x | 7.7x |
| 15 | 2.02 | 8.54 | 2.60 | 61.31 | **64.90** | 64.90 | 32.1x | 7.6x |
| 16 | 2.15 | 9.11 | 2.77 | 64.04 | **68.53** | 68.53 | 31.9x | 7.5x |
| 17 | 2.28 | 8.80 | 2.92 | **63.28** | 47.24 | 63.28 | 27.8x | 7.2x |
| 18 | 2.42 | 9.31 | 3.08 | **60.30** | 48.98 | 60.30 | 24.9x | 6.5x |
| 19 | 2.55 | 9.83 | 3.23 | **59.71** | 50.56 | 59.71 | 23.4x | 6.1x |
| 20 | 2.69 | 10.35 | 3.40 | **63.07** | 50.78 | 63.07 | 23.4x | 6.1x |
| 21 | 2.82 | 10.87 | 3.56 | **63.96** | 51.41 | 63.96 | 22.7x | 5.9x |
| 22 | 2.96 | 11.38 | 3.72 | **56.93** | 51.74 | 56.93 | 19.2x | 5.0x |
| 23 | 3.09 | 11.91 | 3.87 | **56.21** | 51.45 | 56.21 | 18.2x | 4.7x |
| 24 | 3.22 | 12.42 | 4.03 | **59.46** | 56.74 | 59.46 | 18.5x | 4.8x |

FIG. 4A

TABLE 3 (CONTINUED)

| | | | | | | | | |
|---|---|---|---|---|---|---|---|---|
| 25 | 3.36 | 12.94 | 4.19 | **59.30** | 53.89 | 59.30 | 17.6x | 4.6x |
| 26 | 3.50 | 13.45 | 4.35 | 53.37 | **54.81** | 54.81 | 15.7x | 4.1x |
| 27 | 3.63 | 13.97 | 4.50 | 53.49 | **56.45** | 56.45 | 15.6x | 4.0x |
| 28 | 3.76 | 14.49 | 4.67 | 54.66 | **58.65** | 58.65 | 15.6x | 4.0x |
| 29 | 3.89 | 15.01 | 4.82 | 54.39 | **59.23** | 59.23 | 15.2x | 3.9x |
| 30 | 4.03 | 15.52 | 4.97 | 50.67 | **60.25** | 60.25 | 15.0x | 3.9x |
| 31 | 4.17 | 16.05 | 5.13 | 50.83 | **59.76** | 59.76 | 14.3x | 3.7x |
| 32 | 4.30 | 18.02 | 5.28 | 50.39 | **74.18** | 74.18 | 17.3x | 4.1x |
| 33 | 4.42 | 16.73 | 5.39 | **48.47** | 40.35 | 48.47 | 11.0x | 2.9x |
| 34 | 4.56 | 17.24 | 5.55 | **44.82** | 42.32 | 44.82 | 9.8x | 2.6x |
| 35 | 4.69 | 17.75 | 5.71 | **45.69** | 42.33 | 45.69 | 9.7x | 2.6x |
| 36 | 4.82 | 18.29 | 5.87 | **46.95** | 47.65 | 46.95 | 10.2x | 2.7x |
| 37 | 4.95 | 18.76 | 6.03 | **49.35** | 44.18 | 49.35 | 10.0x | 2.6x |
| 38 | 5.09 | 19.26 | 6.18 | 38.86 | **46.35** | 46.35 | 9.1x | 2.4x |
| 39 | 5.22 | 19.77 | 6.34 | 39.62 | **45.71** | 45.71 | 8.8x | 2.3x |
| 40 | 5.36 | 20.27 | 6.51 | 42.40 | **56.94** | 56.94 | 10.6x | 2.8x |
| 41 | 5.49 | 20.79 | 6.65 | 42.99 | **47.49** | 47.49 | 8.7x | 2.3x |
| 42 | 5.63 | 21.29 | 6.82 | 39.58 | **49.62** | 49.62 | 8.8x | 2.3x |
| 43 | 5.76 | 21.80 | 6.98 | 40.42 | **48.86** | 48.86 | 8.5x | 2.2x |
| 44 | 5.89 | 22.31 | 7.13 | 42.86 | **54.39** | 54.39 | 9.2x | 2.4x |
| 45 | 6.03 | 22.81 | 7.28 | 43.56 | **50.88** | 50.88 | 8.4x | 2.2x |
| 46 | 6.16 | 23.32 | 7.44 | 40.41 | **53.08** | 53.08 | 8.6x | 2.3x |
| 47 | 6.29 | 23.84 | 7.60 | 41.08 | **52.22** | 52.22 | 8.3x | 2.2x |
| 48 | 6.43 | 24.42 | 7.77 | 38.77 | **71.95** | 71.95 | 11.2x | 2.9x |
| Avg: | 3.35 | 12.98 | 4.16 | 53.63 | 50.07 | 57.80 | 32.8x | 8.0x |

FIG. 4B

TABLE 4

Optimal GEMV kernel type, $\delta_t$ and $\delta_r$ for $M = 10^6$ and $N \in [2, 48]$

| $N$ | kernel type | $\delta_t$ | $\delta_r$ |
|---|---|---|---|
| 2 | *ConstN* | 12 | 2 |
| 3 | *ConstN* | 12 | 4 |
| 4 | *ConstN* | 12 | 2 |
| 5 | *ConstN* | 16 | 1 |
| 6 | *ConstN* | 10 | 2 |
| 7 | *ConstN* | 16 | 1 |
| 8 | *ConstN* | 14 | 1 |
| 9 | *ConstN* | 10 | 1 |
| 10 | *ConstN* | 8 | 1 |
| 11 | *ConstN* | 8 | 1 |
| 12 | *ConstN* | 8 | 1 |
| 13 | *ConstN* | 8 | 1 |
| 14 | *ConstN* | 8 | 1 |
| 15 | *VarN* | 6 | 1 |
| 16 | *VarN* | 7 | 1 |
| 17 | *ConstN* | 14 | 1 |
| 18 | *ConstN* | 10 | 1 |
| 19 | *ConstN* | 10 | 1 |
| 20 | *ConstN* | 12 | 1 |
| 21 | *ConstN* | 12 | 1 |
| 22 | *ConstN* | 8 | 1 |
| 23 | *ConstN* | 8 | 1 |
| 24 | *ConstN* | 10 | 1 |

FIG. 5A

TABLE 4 (CONTINUED)

| 25 | ConstN | 10 | 1 |
|----|--------|----|---|
| 26 | VarN   | 4  | 1 |
| 27 | VarN   | 4  | 1 |
| 28 | VarN   | 4  | 1 |
| 29 | VarN   | 4  | 1 |
| 30 | VarN   | 4  | 1 |
| 31 | VarN   | 4  | 1 |
| 32 | VarN   | 6  | 1 |
| 33 | ConstN | 10 | 1 |
| 34 | ConstN | 10 | 1 |
| 35 | ConstN | 10 | 1 |
| 36 | ConstN | 10 | 1 |
| 37 | ConstN | 10 | 1 |
| 38 | VarN   | 4  | 1 |
| 39 | VarN   | 4  | 1 |
| 40 | VarN   | 8  | 1 |
| 41 | VarN   | 4  | 1 |
| 42 | VarN   | 4  | 1 |
| 43 | VarN   | 10 | 1 |
| 44 | VarN   | 4  | 1 |
| 45 | VarN   | 4  | 1 |
| 46 | VarN   | 4  | 1 |
| 47 | VarN   | 4  | 1 |
| 48 | VarN   | 5  | 1 |

600

Histogram of *1B1R* kernels' optimal $\delta_t$ for $M = 10^6$ and $N \in [2, 1024]$

700

Histogram of *ConstN* kernels' optimal $\delta_t$ for $M = 10^6$ and $N \in [2, 1024]$

800

Histogram of *VarN* kernels' optimal $\delta_t$ for $M = 10^6$ and $N \in [2, 1024]$

TABLE 5

Maximum over minimum speed of same-type GEMV kernels for $M = 10^6$ and $N \in [2, 48]$

| *N* | *1B1R* | *ConstN* | *VarN* |
|---|---|---|---|
| 2 | 1.30x | 1.58x | 1.21x |
| 3 | 1.27x | 1.54x | 1.25x |
| 4 | 1.26x | 1.37x | 1.24x |
| 5 | 1.26x | 1.23x | 1.25x |
| 6 | 1.26x | 1.82x | 1.26x |
| 7 | 1.25x | 1.61x | 1.26x |
| 8 | 1.25x | 2.07x | 1.25x |
| 9 | 1.25x | 1.89x | 1.25x |
| 10 | 1.25x | 2.13x | 1.25x |
| 11 | 1.25x | 1.98x | 1.24x |
| 12 | 1.25x | 2.94x | 1.25x |
| 13 | 1.25x | 2.55x | 1.24x |
| 14 | 1.25x | 2.59x | 1.23x |
| 15 | 1.25x | 2.34x | 1.23x |
| 16 | 1.25x | 2.72x | 1.25x |
| 17 | 1.25x | 2.38x | 1.31x |
| 18 | 1.24x | 2.52x | 1.29x |
| 19 | 1.24x | 2.23x | 1.28x |
| 20 | 1.25x | 2.62x | 1.26x |
| 21 | 1.25x | 2.36x | 1.23x |
| 22 | 1.25x | 2.36x | 1.19x |
| 23 | 1.25x | 2.08x | 1.16x |
| 24 | 1.25x | 2.63x | 1.29x |

FIG. 9A

TABLE 5 (CONTINUED)

| | | | |
|---|---|---|---|
| 25 | 1.25x | 2.51x | 1.16x |
| 26 | 1.25x | 2.34x | 1.15x |
| 27 | 1.26x | 2.24x | 1.16x |
| 28 | 1.26x | 2.37x | 1.17x |
| 29 | 1.26x | 2.25x | 1.17x |
| 30 | 1.26x | 2.17x | 1.16x |
| 31 | 1.26x | 2.08x | 1.14x |
| 32 | 1.29x | 2.00x | 1.27x |
| 33 | 1.26x | 1.97x | 1.07x |
| 34 | 1.26x | 1.91x | 1.08x |
| 35 | 1.26x | 1.84x | 1.08x |
| 36 | 1.26x | 2.05x | 1.12x |
| 37 | 1.26x | 1.98x | 1.08x |
| 38 | 1.26x | 1.63x | 1.10x |
| 39 | 1.27x | 1.58x | 1.09x |
| 40 | 1.27x | 1.73x | 1.20x |
| 41 | 1.26x | 1.70x | 1.09x |
| 42 | 1.27x | 1.63x | 1.11x |
| 43 | 1.27x | 1.59x | 1.09x |
| 44 | 1.27x | 1.75x | 1.14x |
| 45 | 1.27x | 1.71x | 1.10x |
| 46 | 1.27x | 1.63x | 1.11x |
| 47 | 1.27x | 1.60x | 1.09x |
| 48 | 1.29x | 1.60x | 1.22x |
| Avg: | 1.26x | 2.03x | 1.19x |

Speedup against MAGMA and cuBLAS for $N \in [10, 96]$

SYSTEM AND METHOD FOR SPEEDING UP GENERAL MATRIX-VECTOR MULTIPLICATION ON GPU

FIELD

The present disclosure generally relates to general matrix-vector multiplication (GEMV) on a graphics processing unit (GPU). More specifically, the present disclosure relates to a method and system for time- and space-efficient GEMV on a GPU that leverages a set of GPU kernels with complementary strength for matrices and vectors of various sizes.

RELATED ART

GEMV is a key linear-algebra operation commonly used in math programming software such as LINPACK, MATLAB, and R. It is a level 2 basic linear algebra subprogram (BLAS), a de facto standard API for linear algebra libraries and routines. Mathematically, GEMV does the following computation:

$$y=\alpha Ax+\beta y$$

where A is an M×N matrix x and y are N×1 and M×1 column vectors respectively, and α, β scalars.

The time complexity of GEMV is O(MN), which is only linear in the size of matrix A. Thus, unlike general matrix-matrix multiplication (GEMM) that tends to be processor-bound, GEMV is more memory-bound, which presents a challenge to the task of keeping all the processors of the GPU busy. Nevertheless, state-of-the-art GPU-based GEMV implementations can still outperform their CPU-based competitors by a significant margin, and further performance improvements are possible.

SUMMARY

One embodiment of the present invention provides a method for performing a GEMV operation. During operation, the system may generate a set of kernels that includes at least one of a variable-N GEMV kernel and a constant-N GEMV kernel. The system may receive data representing at least a matrix and a vector. The system may determine a set of dimensional parameters associated with the matrix and the vector, in which the set of dimensional parameters indicate a number of rows of the matrix and a number of rows of the vector. The system may then select a kernel from the set of kernels for performing the GEMV operation, which involves accessing a set of rules. Note that a rule of the set of rules maps a respective set of dimensional parameters to a respective kernel from the set of kernels. The selected kernel performs the GEMV operation faster than any other kernel in the set of kernels for the respective set of dimensional parameters. The system may then perform the GEMV operation on the matrix and the vector using the selected kernel.

In a variation on this embodiment, the set of kernels includes a variable-rows GEMV kernel. The variable-rows GEMV kernel is one of a variable-N variable-rows GEMV kernel and a constant-N variable-rows GEMV kernel. The system may also generate the variable-rows GEMV kernel to perform GEMV operations for all N columns of a matrix A by performing operations that involve: loading, by a thread block, a $TB_r$×b sub-matrix of the matrix A and a b×1 sub-vector of a vector x to shared memory using coalesced global-memory reads. The system may then multiply, by each thread of the thread block, $\delta_r$ rows of the $TB_r$×b sub-matrix of the matrix A with the b×1 sub-vector of the vector x stored in shared memory. The system may write multiplication results to a $TB_r$×1 sub-vector of a vector y using coalesced global-memory writes. Note that the thread block processes a number of rows $TB_r$ of the matrix A, $TB_r$ is equal to a multiple of a row-factor value, and b is a block size.

In a variation on this embodiment, the set of kernels may include a variable-threads GEMV kernel. The variable-threads kernel is one of a variable-N variable-threads GEMV kernel and a constant-N variable-threads GEMV kernel. The system may then generate the variable-threads GEMV kernel to perform GEMV operations with a number of threads in a thread block equal to a multiple of a thread-factor value.

In a variation on this embodiment, the set of kernels may include one or more constant-N variable-threads-rows GEMV kernels generated with template parameters indicating a row-factor $\delta_r$, a thread-factor $\delta_t$, and N columns of a matrix.

In a variation on this embodiment, the set of kernels may include one or more variable-N variable-threads-rows GEMV kernels generated with template parameters indicating a row-factor $\delta_r$ and a thread-factor $\delta_t$.

In a variation on this embodiment, the set of kernels may include a 1B1R variable-thread GEMV kernel. The system may generate the 1B1R variable-thread GEMV kernel to perform GEMV operations with a thread block processing a single row of a matrix A. Each thread of the thread block may multiply one in every $16\delta_t$ elements of the single row with a corresponding element of a vector x until an end of the single row while keeping a running sum, with the running sums of all threads added up in shared memory. The system may use $\log_2(16\delta_t)-1$ rounds of binary reduction to compute a total sum, and write a final result including the total sum to a vector y.

In a variation on this embodiment, the system may generate the set of rules, which involves determining computation times for each kernel of the set of kernels when performing GEMV operations involving matrix and vector combinations with various dimensions. The system may add, to the set of rules, a rule mapping a set of dimensional parameters to a kernel with a computation time that is faster than any other kernel for the set of dimensional parameters.

In a further variation, the system may use a constant parameter combined with other variable parameters to reduce a number of tests required.

In a further variation, the system may perform non-uniform sampling density along M and N axes of a two-dimensional testing space to obtain a set of <M, N> test pairs.

In a variation on this embodiment, the system may generate a rule database that allows for storage, transfer, sharing, and query of test results among multiple homogeneous GPUs, in order to select a best GEMV kernel for a given set of {M, N} parameters without redundant tests.

In a variation on this embodiment, the system may, in response to determining that a search for a particular {M, N} parameter combination in the set of rules fails, perform a search in the set of rules to find a most similar rule according to predetermined thresholds for at least one of the M and N values.

In a further variation, the system may use a non-negative parameter distance function to determine a proximity of rules in order to determine the most similar rule for the particular {M, N} parameter combination.

In a variation on this embodiment, selecting a kernel may further include selecting a kernel (e.g., 1B1R kernel or a variable-N kernel) mapped from a largest N available in a rules database.

In a variation on this embodiment, the system may perform testing to determine a GEMV kernel that is faster than other kernels for performing GEMV operations on a matrix and vector combination associated with a set of {M, N} parameters, and update a rules database to include a rule mapping the set of {M, N} parameters to the GEMV kernel that is faster than other kernels.

In a variation on this embodiment, the system may apply a GEMV kernel to matrices stored in row-major order without storage padding or apply the GEMV kernel to matrices stored in column-major order without storage padding.

In a variation on this embodiment, the system may use multiple dimensions of a GPU thread grid to encode rows or columns of a matrix A assigned to a thread block, thereby increasing a number of rows of matrices used in matrix-vector multiplication.

BRIEF DESCRIPTION OF THE FIGURES

FIG. 2 presents the pseudocode of a Smart GEMV testing technique, in accordance with an embodiment of the present invention.

FIG. 4A-4B presents Table 3 which shows the performance of GEMV kernels in GFLOPS.

FIG. 5A-5B presents Table 4 which shows optimal GEMV kernel types with $\delta_t$ and $\delta_r$ values.

FIG. 9A-9B presents Table 5 showing maximum over minimum speed for same-type GEMV kernels.

In the figures, like reference numerals refer to the same figure elements.

DETAILED DESCRIPTION

Figure 1:
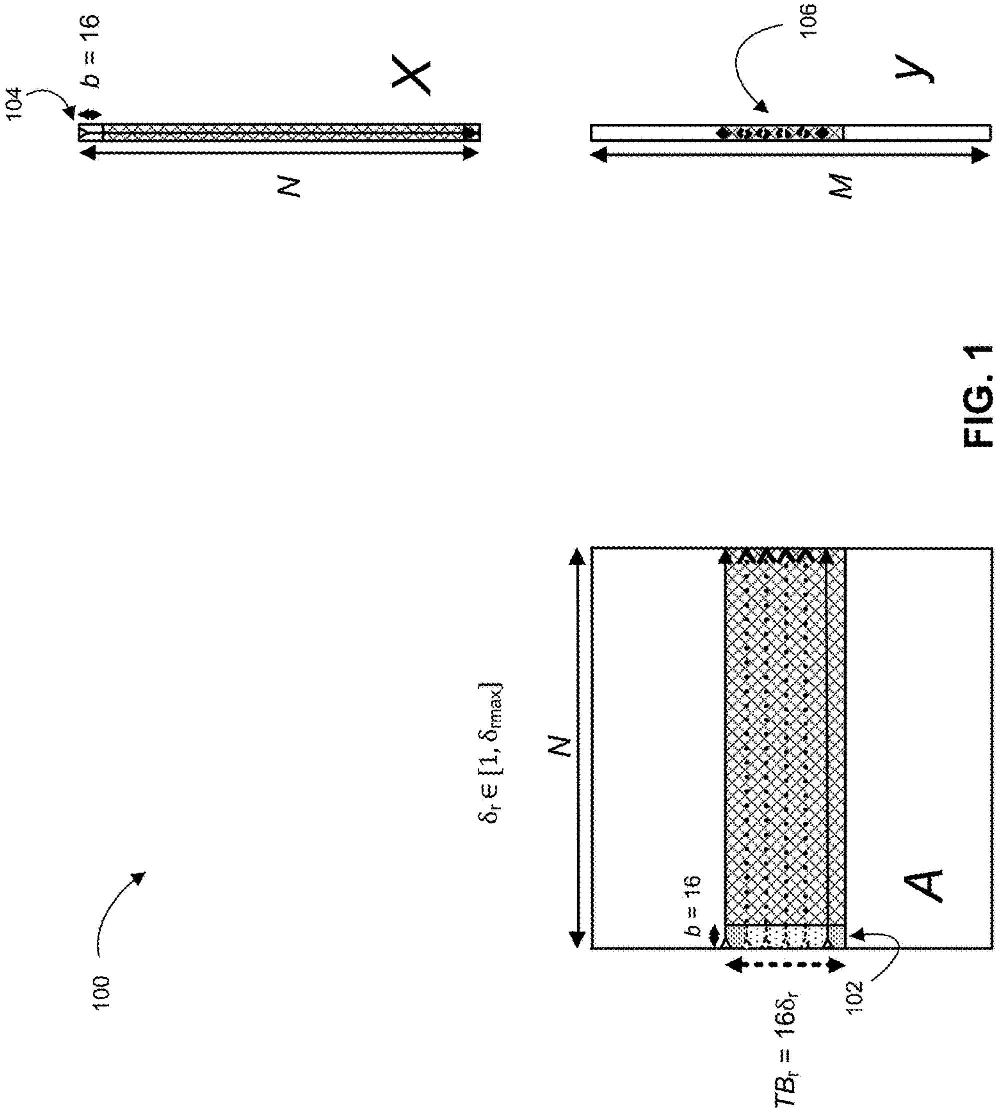
FIG. 1 presents a diagram illustrating GEMV with variable-rows kernels, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of improving performance of GEMV operations by introducing techniques for generating new kernels that can efficiently perform GEMV operations. A kernel is a function that executes on a GPU. Multiple threads may execute the kernel in parallel on the GPU. A GEMV kernel is called an α kernel if, for at least one combination of dimensional parameters, the kernel is the best (e.g., fastest) kernel among a set of GEMV kernels that can perform a GEMV operation for matrix and vector combinations with the dimensional parameters. The dimensional parameters may be the number of rows of a matrix and the number of rows of a vector. The dimensional parameters may be represented by {M, N}, where M is the number of rows of a matrix A, and N is the number of rows of a vector x.

This disclosure describes time- and space-efficient GEMV on the GPU that leverages a set of GPU kernels with complementary strength for matrices and vectors of various sizes. GEMV is a core operation in dense linear algebra packages such as UNPACK, MATLAB, and R. In particular, the disclosed technique outperforms the highly optimized MAGMA and cuBLAS dense linear algebra libraries on GEMV operations that involve tall-and-skinny matrices (e.g., those with millions of rows but only a few dozen columns). Unlike existing approaches, this disclosure does not assume the matrices having any storage padding that can potentially waste a great deal of space, especially on tall-and-skinny matrices. Furthermore, the disclosure provides a foundation for the efficient implementation of GPU-accelerated machine learning and data mining techniques that share a similar memory access pattern as GEMV (with bias towards tall-and-skinny matrices).

A system for performing GEMV operations may initially generate kernels and associated rules to select the best kernels for performing GEMV operations. In some embodiments, the system may generate constant-N GEMV kernels, variable-N GEMV kernels, variable-rows GEMV kernels, variable-threads GEMV kernels, and 1B1R variable-thread GEMV kernels.

A constant-N GEMV kernel performs GEMV operations for a specific value of N. The system may select a constant-N GEMV kernel for matrix and vector combinations with dimensional parameters that includes an N value matching the N value of the selected constant-N GEMV kernel. Variable-N GEMV kernels may handle all values of N.

Variable-rows GEMV kernels allow for flexibility in the number of rows of the matrix (e.g., size of $TB_r$) used by a thread block in computing a sub-vector. The system may select the best variable-rows GEMV kernel for performing computations according to the particular parameter combination of the matrix and vector being multiplied.

Variable-threads GEMV kernels allow for controlling the size of a thread block. One can specify the number of threads of a thread block as a multiple of a thread-factor value. 1B1R variable-thread GEMV kernels employ an entire thread block to process a single row of a matrix.

In some embodiments, the system may generate kernels that include combinations of features. For example, the system may generate constant-N variable-rows GEMV kernels and variable-N variable-rows GEMV kernels. As another example, the system may generate constant-N variable-threads GEMV kernels and variable-N variable-threads GEMV kernels. The system may also generate constant-N variable-threads-rows GEMV kernels and variable-N variable-threads-rows GEMV kernels.

In some embodiments, the system may perform a series of tests to determine the best kernel for performing a GEMV operation on matrix and vector combinations with particular dimensional parameters. The system can store test results in a lookup table. The system can generate a rule each time the system determines the fastest kernel from test results, and add the rule to a set of rules stored in a database. The system may then apply the rules to select the best kernel (e.g., the Smart kernel) for performing a GEMV operation on matrix and vector combinations with particular dimensional parameters.

The system need only perform the experiments once to determine the best kernels for particular dimensional parameters, and whether a kernel is the best kernel for a particular parameter combination does not vary with time. Note that a Smart kernel can correctly perform GEMV operations for matrix and vector combinations with a wide variety of dimensional parameters, although it is not necessarily the fastest kernel for parameter combinations that are not indicated in a rule for the Smart kernel.

MAGMA and Row-Major Order Vs Column-Major Order

Matrix Algebra on GPU and Multicore Architectures (MAGMA) one of the best open-source dense linear algebra libraries that offer high-performance GEMV routines optimized for the latest GPUs including NVIDIA's Fermi and Kepler GPUs. Like other BLAS libraries, MAGMA supports two variants of GEMV, depending on whether matrix A needs to be transposed first or not. If so, then the formula above for GEMV would become $y=\alpha A^T x+\beta y$, where $A^T$ is A transposed.

Of particular interest in this disclosure are matrices with the following characteristics:

Tall-and-skinny

Row-major order

Commonly found in many analytics applications, tall-and-skinny matrices stored in row-major order are a unique challenge to GPU-based GEMV implementations optimized for square-shaped matrices stored in column-major order. While it has been a tradition in BLAS packages to assume column-major matrix storage, the wide-spread use of row-friendly formats such as .csv and .tsv files makes it somewhat awkward to work directly with column-major matrices, especially in the context of machine learning and data mining. Furthermore, mainstream programming languages such as C/C++ and Python have built-in support for multi-dimensional arrays in row-major order, which leads naturally to row-major matrices and their higher-dimensional generalizations. Thus, having GEMV routines with native support for row-major matrices on the GPU can eliminate the need to translate back and forth between CPU's row-major and GPU's column-major representations of the same matrix, thereby improving both time and storage efficiency.

From a storage viewpoint, a row-major matrix can be seen as a column-major matrix in its transposed form. Thus, from a programming standpoint, it is just as easy to multiply a row-major matrix with a vector as a column-major matrix, by using formula $y=\alpha A^T x+\beta y$ instead of the original, non-transposed version. Since matrix A is transposed on the fly, $A^T$ is not explicitly stored and thus no storage overhead is incurred. However, the issue here is speed, which is the main reason for using GPUs in the first place. For example, if M=10,000 and N=2, the GEMV performance measured in terms of GFLOPS ($10^9$ floating-point operations per second) on Nvidia's GeForce GTX 580 and a dual-CPU system with two Intel Xeon X5690 processors at 3.47 GHz is as follows:

TABLE 1

Performance comparison of GEMV (in GFLOPS) between GPU and CPU for M = 10,000 and N = 2

| Matrix order | MAGMA (GPU) | cuBLAS (GPU) | BLAS Fortran77 (CPU) |
|---|---|---|---|
| Column-major | 4.27 | 2.40 | 2.49 |
| Row-major | 0.25 | 0.75 | 0.87 |
| Slowdown: | 17x | 3.2x | 2.9x |

As shown in Table 1, MAGMA outperforms the CPU-based. BLAS Fortran77 reference implementation for M=10,000 and N=2, if the matrix is column-major. However, both MAGMA and cuBLAS become slower than their CPU counterpart if the matrix is row-major. The last row of Table 1 shows the slowdown caused by column-major being replaced by row-major order. MAGMA, which is the fastest for column-major, slows down by a factor of 17 to become the slowest of the three for row-major. On the other hand, there is only a factor of 2.9 slowdown for BLAS Fortran77, which is the fastest in Table 1 for row-major. Thus, depending on the matrix order, either GPU or CPU may outperform the other, making it difficult to find a single best implementation for GEMV.

MAGMA employs different GPU kernel functions to perform GEMV, depending on the value of M and whether A must be transposed or not. For row-major matrices, MAGMA uses the GEMV kernel with transposition: each row of A is assigned to a block of 128 threads, each responsible for multiplying one in every 128 elements of the row with the corresponding element of x while accumulating a running sum, which is finally reduced in shared memory with other thread's running sums (in 6 binary-reduction rounds) to a single grand total sum before the final result is computed and written to vector y by thread 0, the first thread in the block. Since the matrix is in row-major order, consecutive elements of the same row are accessed by consecutive threads in the same block. Such a memory access pattern leads to coalesced memory reads and writes that are critical to achieving high-speed GEMV on the GPU. For example, 16 threads accessing contiguous memory on Nvidia. GPUs can be served with a single coalesced memory transaction.

Although GPU-based GEMV has shown significant speedups against CPU-based implementations, it can still suffer from low parallel efficiency, as the shape of A deviates significantly from a square. In particular, if matrix A is tall-and-skinny, e.g., M>>1,000 and N≤96, MAGMA can only achieve a fraction of its peak GEMV performance, even when the amount of computation, which is O(MN), is large. For instance, the GEMV speed on an 8256×8256 square matrix is 80.10 and 78.00 GFLOPS for MAGMA and cuBLAS, respectively; whereas BLAS Fortran77 is only 2.18 GFLOPS, a slowdown of more than 36× against MAGMA. But if A is a 1,000,000×68 (tall-and-skinny) matrix, which has roughly the same number of elements as an 8256×8256 square matrix, the GEMV speed for MAGMA and cuBLAS is 8.84 and 29.83 GFLOPS, which represent a 9× and a 2.6× slowdown from the ideal case of A being square, respectively. In other words, the performance of GEMV depends not only on M×N being sufficiently large, but also on their specific values. For MAGMA, the best scenario occurs when M=N>>128, which is how the default testing parameters are set for GEMV. However, in worst-case scenarios such as M>>N=2, it becomes inefficient to use the same GEMV kernel with transposition for row-major matrices, because assigning 128 threads to each row that only has 2 elements would cause severe underutilization of the GPU cores. In general, the more M and N deviate from their best-case values (i.e., M=N>>128), the higher the risk MAGMA would underutilize the GPU hardware, leading to sub-optimal parallelization.

MAGMA and cuBLAS store their matrices in column-major order. For optimal performance, it is recommended that the start address of each column be 128-byte aligned (i.e., the address is divisible by 128). This is done by adding zeroes to the end of each column (except for the last one) such that the start address of the next column is still 128-byte aligned. The extra zeroes at the end of each column are storage paddings that should not affect the GEMV results. Nevertheless, they can take up a significant portion of the space, especially for small N's (or M's in the transposed case). For example, when N=2, the storage paddings account for 93.75% of the space, and only 6.25% is used to store the actual matrix. Unlike MAGMA or cuBLAS, the technique described in this disclosure achieves high-performance GEMV without any storage padding.

For MAGMA, there appears to be a limit on how large M or N can be, because the distribution of A's columns and rows to thread blocks is achieved with the help of the X and Y grid dimensions that are subject to hardware-imposed limits. For Fermi GPUs, the limits are M≤65535 and N≤65535. For Kepler GPUs, they are $M \leq 2^{32}-1$ and N≤65535. Since it is not uncommon to have tall-and-skinny matrices with over 65535 rows (or columns in the transposed case), MAGMA is not suitable for handling matrices with a large number of rows or columns. If launched with an off-limit M or N, the GEMV kernels in MAGMA (version 1.4.1) would return immediately without generating an error message, potentially putting the integrity of computation at risk.

Kernel Functions with Complementary Strength

The starting point of this disclosure is the observation that a single GEMV technique on the GPU, no matter how optimized, may not perform well for all possible matrix sizes in terms of M and N. Thus, a more practical strategy is to have a collection of GEMV techniques from which the best one can be selected given the size of the matrix. To do so with the GPU, embodiments of the present invention may use a set of kernel functions with complementary strength such that the exclusion of any kernel in the set would result in degraded GEMV performance for some values of M and N. In the context of this disclosure, it is referred to as GEMV with Smart Kernels or simply Smart GEMV.

A kernel function $f$ is useful with respect to a set of kernel functions F, if and only if its performance is strictly better than all the rest of kernels $f' \in F$ for at least one problem instance. In the rare event that two potentially useful kernel functions have exactly the same performance on all possible problem instances, one can randomly pick one and discard the other as useless. With proper tie-breaking, the set of useful kernel functions is unique for any collection of kernel functions that solve the same type of problems. To determine their usefulness, kernel functions are tested over a range of problem instances and compared against one another for best performance. In practice, testing kernel functions on all problem instances is not required, especially for operations like GEMV whose performance is only affected by discrete parameters M and N, but not by α, β, and the values of elements stored in A, x, and y.

An interesting question is how to come up with an initial set of candidate functions from which the useful ones can be selected. This motivates a more thorough exploration of the design space for GEMV techniques than previously studied. Described below is a set of techniques along which the GEMV design space is explored in this disclosure.

Constant-N Vs Variable-N GEMV Kernels:

Loop unrolling is a technique for speeding up GPU kernel functions with an iterative structure, especially if the number of times the loop will be executed can be determined at compile time. But oftentimes the exact loop counts are unknown until the execution of the kernel, limiting the level of compile-time optimization performed on the kernel. For improved efficiency, this disclosure distinguishes two basic types of GEMV kernels:

- constant-N GEMV kernels, each of which handles a specific value of N, but all values of M
- variable-N GEMV kernels, each of which handles all values of N, and all values of M Although less general, constant-N GEMV kernels can run faster, because better optimized code can be generated if N is known at compile time. More importantly, constant-N kernels may save shared memory, which is limited to 48 KB per SM on NVIDIA's GPUs, by allocating the precise amount that is needed for a specific value of N rather than for all possible values. This makes it possible for the GPU to have more active thread blocks (TBs) at the same time, because more of them can fit in the 48 KB of shared memory of a streaming multiprocessor (SM). For small N's, constant-N GEMV kernels can store more rows (or columns) of matrix A in shared memory, resulting in more elements of y computed by a single TB and thereby improving performance. Note that MAGMA only has variable-N kernels for GEMV, and the concept of constant-N kernels (or any constant-parameter BLAS kernels) is new. As the experiments will show, constant-N kernels perform the best for small N's, and thus only a small number of such kernels need to be included in a Smart GEMV implementation.

Variable-Rows GEMV Kernels:

FIG. 1 presents a diagram 100 illustrating GEMV with variable-rows kernels, in accordance with an embodiment of the present invention. Unlike MAGMA, variable-rows GEMV kernels can use shared memory to speed up the computation. A thread block (TB) of such kernels is responsible for processing $TB_r$ rows of matrix A, as illustrated by FIG. 1. To compute a sub-vector of y, a TB uses $\lceil N/b \rceil$ iterations, each responsible for processing b columns of A. The kernel works as follows:

1. The TB loads $TB_r \times b$ sub-matrix of A 102 and b×1 sub-vector of x 104 to shared memory, using coalesced global-memory reads
2. Each thread of the TB multiplies $\delta_r$ rows of the sub-matrix with the sub-vector stored in shared memory
3. Repeat 1 & 2 until all N columns are processed
4. Complete the rest of GEMV computation and write the results to $TB_r \times 1$ sub-vector of y 106, using coalesced global-memory writes where b is the block size typically set to be the maximum number of contiguous memory accesses that can be combined into a single coalesced memory transaction. For NVIDIA GPUs, b is 16, half of the size of a warp, which is a group of 32 threads in a single SM.

$\delta_r$ is a positive integer $\in [1, \delta_{rmax}]$ called the row-factor. The idea behind $\delta_r$ is to increase the amount of work done by each thread for improved instruction-level parallelism (ILP). The choice of $\delta_r$ depends on many factors of the GPU, including the maximum number of registers per thread, the size of shared memory on each SM, and the number of threads in a TB. As the experiments will show, the best $\delta_r$ usually varies as M and N change. In FIG. 1, each thread of the variable-rows kernel processes $\delta_r$ rows of matrix A with stride 16, and thus a TB has 16 threads and $TB_r=16\delta_r$. In other words, $TB_r$ is a multiple of 16, up to some maximum value $16\delta_{max}$. For example, the $\delta_r$ rows of A assigned to the first thread are marked as right-pointing triangles with stride 16, and the $\delta_r$ elements of y computed by the same thread are marked as ♦ in FIG. 1.

Variable-Threads GEMV Kernels:

Variable-threads GEMV kernels offers extra flexibility in choosing the optimal $TB_r$ (the number of rows processed by a single TB). In the previous example shown in FIG. 1, the variable-rows kernel uses a TB of 16 threads, which may not be enough to keep all the GPU cores busy. To use more threads, one can use variable-threads GEMV kernels in which the size of a TB is controlled by a positive integer $\delta_t \in [1, \delta_{tmax}]$ called the thread-factor such that the number of threads of a TB is equal to $16\delta_t$. That is, variable-threads kernels can implement a range of different TB sizes from 16 to $16\delta_{tmax}$, as long as it is a multiple of 16.

Variable-threads and variable-rows GEMV kernels are orthogonal concepts that can be easily combined into a general class called variable-threads-rows GEMV kernels, in which a single TB has $16\delta_t$ threads, each responsible for processing $\delta_r$ rows of matrix A, for a total of $TB_r=16\delta_t\delta_r$ rows processed by the TB. Note that each thread of such kernels takes a stride of $16\delta_t$ (instead of 16 rows as shown in FIG. 1) to process the $\delta_r$ rows it is responsible for.

Similarly, the concepts of constant-N and variable-N GEMV kernels are also orthogonal to that of variable-threads-rows kernels. As such, they can be combined with the latter to create even more generalized GEMV kernels, including (a) constant-N variable-threads-rows GEMV kernels and (b) variable-N variable-threads-rows GEMV kernels. To simplify the description, the former is called ConstN and the latter VarN kernels, both accepting $\delta_r$ and $\delta_t$ as their template parameters. The main difference between the two is that ConstN kernels accept N as an additional template parameter, since each ConstN kernel only needs to work with a specific value of N.

To allow static code optimization, one can implement $\delta_r$ and $\delta_t$ as template (e.g., C++ template) parameters that are known at compile time. Thus, instead of having one kernel that handles all possible row-factors and thread-factors, one can have a $\delta_{rmax} \times \delta_{tmax}$ array of VarN kernels such that each implements a specific combination of $\delta_r \in [1, \delta_{rmax}]$ and $\delta_t \in [1, \delta_{tmax}]$. The same static-optimization technique applies to the implementation of the ConstN kernels.

Besides the parameterized ConstN and VarN kernels, a set of one-block-one-row (1B1R) variable-thread GEMV kernels, called 1B1R kernels, are also included to handle large values of N. 1B1R kernels employ the entire TB to process just a single row of A, using $16\delta_t$ threads such that:

1. Each thread is responsible for multiplying one in every $16\delta_t$ elements of the row with the corresponding element of x until the end of the row, while keeping a running sum.
2. The running sums of all threads are added up in shared memory, using $\log_2(16\delta_t)-1$ rounds of binary reduction to get a single grand total sum.
3. Complete the rest of GEMV computation and write the final result to vector y by thread 0 (the first thread of the TB).

TABLE 2

Smart GEMV kernel types and their applicable template parameters

| Kernel type | $\delta_t$ | $\delta_r$ | N |
|---|---|---|---|
| 1B1R | ✓ | | |
| ConstN | ✓ | ✓ | ✓ |
| VarN | ✓ | ✓ | |

Table 2 summarizes the three Smart GEMV kernel types {1B1R, ConstN, VarN} and their applicable template parameters.

While the introduction of various Smart GEMV kernels lets one explore more thoroughly the design space of GEMV techniques, it also brings along two challenges:

1. How to discover which kernel is the best for which values of M and N?

2. How to store such knowledge that allows efficient query of the best kernel for any combination of M and N?

To address the first challenge, a testing technique is used to measure the speed of various kernels such that the best (e.g., fastest) kernel is identified for each of M and N combinations tested. Due to the importance of tall-and-skinny matrices in data analytics applications, the current disclosure focuses on the cases where $M \gg N \in [2, 96]$. From a data mining or machine learning perspective, M and N can be interpreted as follows:

M: the number of input vectors in the training or test set,

N: the number of features in each input vector

Usually, $M \gg N$, which makes tall-and-skinny matrices more suitable than regularly-shaped (e.g., square) matrices for machine learning. In the experiments, M is set to be $10^6$ to make sure matrix A is sufficiently "tall" and $N \le 96$ to make sure it is "skinny."

FIG. 2 presents a pseudocode 200 of a Smart GEMV testing technique, in accordance with an embodiment of the present invention. FIG. 2 shows the pseudocode of the Smart GEMV testing technique, which tests the GEMV kernels on various combinations of M and N and stores the best kernel for handling each combination as rules that the testing technique outputs in the end. Unlike MAGMA, the GEMV kernels of this disclosure can handle large values of M such that $\lfloor M/TB_r \rfloor$ exceeds the number of thread blocks that can be encoded in the $1^{st}$ dimension of the thread grid limited by the hardware. By using both the $1^{st}$ and $2^{nd}$ dimensions of the thread grid to encode $\lceil M/TB_x \rceil$, ConstN and VarN kernels can handle M as large as 65,535*65,535*16*$\delta_r$*$\delta_t$=6.87E10$\delta_r\delta_t \ge$6.87E10 (since both $\delta_r$ and $\delta_t \ge 1$); whereas 1B1R kernels can handle M as large as 65,535*65,535=4.29E9, regardless of the value of $\delta_t$. For Kepler GPUs, the maximum M is still 65,537 times larger.

Note that the technique shown in FIG. 2 is not limited to tall-and-skinny matrices, since it can include $\langle M, N \rangle$ test pairs even for M=N (i.e., square matrices). Thus, the rules generated can be used to select the best GEMV kernel for processing regularly-shaped as well as tall-and-skinny matrices. However, if it is used in applications that primarily involve tall-and-skinny matrices, then the testing technique can be simplified to use a large, constant M (e.g., $M \equiv 10^6$) in all of the test pairs, because one only needs to know the relative speed of different kernels in order to pick the fastest one, which is typically insensitive to the value of M if it is already large. For example, the fastest GEMV kernel for a matrix with one million rows may still be the fastest for another matrix with 10× more rows (i.e., $M=10^7$), if N remains the same. On the other hand, even if M is the same, the fastest kernel can still vary significantly for different values of N, which are typically small for tall-and-skinny matrices. Thus, a better strategy of Smart GEMV testing customized for tall-and-skinny matrices is to use a single large fixed M with many different N's to more efficiently map out the 2-dimensional M-N parameter space of GEMV. As the experiments will show, the performance of GEMV kernels, under the same M but different N's, varies substantially.

For the same GPU hardware, testing only needs to be done once for each ⟨M, N⟩ test pair, and one can use multiple homogeneous GPUs to speed up the testing process. To share the results of testing across different GPUs, one can use a declarative rule-based system to store and query the kernel selection rules. A declarative kernel selection rule in this disclosure takes the form of "parameters→kernel" in which "parameters" is a set of parameters for a problem instance that can affect the selection of the kernel, and "kernel" identifies the best kernel for the problem instance described by parameters. For GEMV, one can use {M, N} as the parameters, or simply N, if M is large enough that the performance of a kernel is more or less independent of. For the "kernel" part (i.e., the right-hand side) of a rule, there are a number of ways to identify the best kernel such as:

Numeric identifier of the GEMV kernel

Symbolic name of the GEMV kernel

List of kernel features that can uniquely identify the GEMV kernel

The first option requires each kernel having a unique numeric identifier, which may be harder to keep track and thus more difficult to maintain over time. The last two options are easier to understand and less error-prone. For example, according to Table 4 the fastest kernel for $M=10^6$ and N=2 is the constant-N variable-threads-rows kernel with $\delta_t=12$ and $\delta_r=2$, which can be uniquely described as the "type=ConstN, $\delta_t=12$, $\delta_r=2$" kernel. For simplicity, a GEMV kernel can be written as a ⟨type, $\delta_t$, $\delta_r$⟩ tuple, where type ∈{1B1R, ConstN, VarN}, $\delta_t \in [1, \delta_{tmax}]$, and $\delta_r \in [1, \delta_{rmax}]$ are the features of the kernel. For example, the first 6 rows of Table 4 can be expressed in the form of "M, N→type, $\delta_x$, $\delta_y$" as follows:

$10^6$, 2→ConstN, 12, 2
$10^6$, 3→ConstN, 12, 4
$10^6$, 4→ConstN, 12, 2
$10^6$, 5→ConstN, 16, 1
$10^6$, 6→ConstN, 10, 2
$10^6$, 7→ConstN, 16, 1

For tall-and-skinny matrices, one may omit M in the left side of the rule, since it rarely affects the selection of the best GEMV kernel. As a result, the previous example rules can be simplified to:

2→ConstN, 12, 2
3→ConstN, 12, 4
4→ConstN, 12, 2
5→ConstN, 16, 1
6→ConstN, 10, 2
7→ConstN, 16, 1

If a particular GEMV instance has an N not previously tested, the technique can either perform the test on the fly, run the fastest kernel found, and add the newly discovered rule to the rule database, or find a rule that is the most similar, and pick the kernel prescribed by the most-similar rule To determine how similar two rules are to one another, one can use a non-negative parameter distance function d, such that $d(p, p)\equiv 0$ and $d(p_1, p_2)>0$, if parameters $p_1 \neq p_2$. To further distinguish the type of GEMV kernels, the parameter distance function d takes as additional input t, the type of the kernel. Let $p_1=N_1$ and $p_2=N_2$. Function $d(p_1, p_2, t)$ can be implemented as follows:

```
if t = constN and N1 ≠ N2 then return ∞   /* constant-N kernels must
                                              agree on N */
dist ←||N1 − N2||                          /* dist: distance in terms of N */
return dist
```

Since the performance difference tends to decrease as N increases, it usually suffices to pick the best 1B1R or VarN kernel prescribed for the largest N available in the rule database. This creates a simple fallback rule that can be used whenever the technique is presented with a novel N untested before.

Exemplary Process to Perform GEMV Operation

Figure 3:
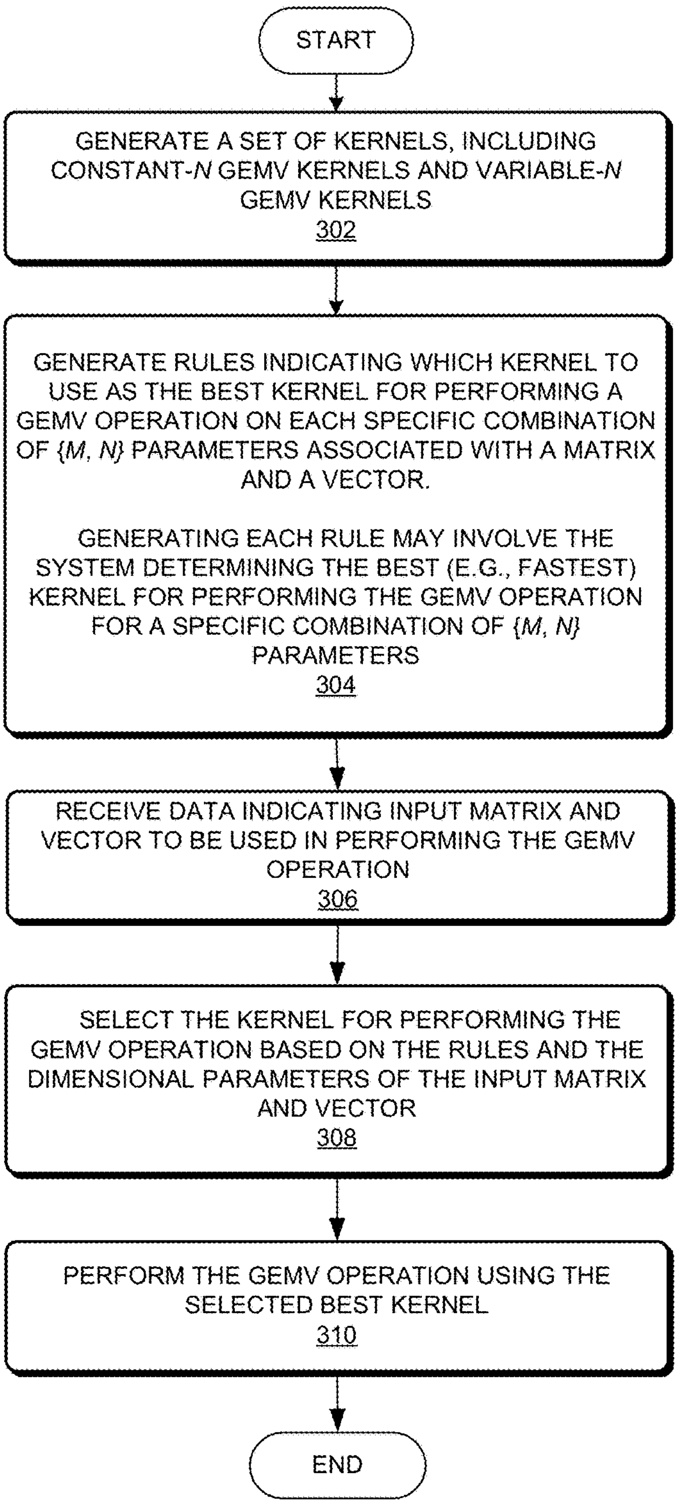
FIG. 3 presents a flow chart illustrating an exemplary process for performing a GEMV operation, in accordance with an embodiment of the present invention.

FIG. 3 presents a flow chart illustrating an exemplary process for performing a GEMV operation, in accordance with an embodiment of the present invention. As depicted in FIG. 3, the system may initially generate a set of kernels, including constant-N GEMV kernels and variable-N GEMV kernels (operation 302). The system may generate constant-N variable-rows GEMV kernels and variable-N variable-rows GEMV kernels. The system may generate constant-N variable-threads GEMV kernels, and variable-N variable-threads GEMV kernels. The system may also generate variable-threads-rows GEMV kernels for the set. This may include ConstN kernels (e.g., constant-N variable-threads-rows GEMV kernels), and VarN kernels (e.g., variable-N variable-threads-rows GEMV kernels). The system may also generate 1B1R variable-thread GEMV kernels.

The system may generate rules indicating which kernel to use as the best kernel for performing a GEMV operation on each specific combination of {M, N} parameters associated with a matrix and a vector (operation 304). Generating each rule may involve the system determining the best (e.g., fastest) kernel for performing the GEMV operation for a specific combination of {M, N} parameters. In some embodiments, the system may generate a rule and add the rule to a rules set each time the system determines the best kernel for a particular combination of {M, N} parameters. In this manner, the system may determine the Pareto frontier of the set of kernels. Each kernel in the Pareto frontier is the best (e.g., fastest) at performing at least one GEMV operation involving a {M, N} parameter combination.

The system may subsequently receive data indicating an input matrix and vector to be used in performing the GEMV operation (operation 306). The system may select the kernel for performing the GEMV operation based on the rules and the dimensional parameters of the input matrix and vector (operation 308). The dimensional parameters may include the number of rows and columns of the matrix and number of rows of the vector.

The system may access a rules collection stored in a database to determine a mapping from the dimensions of the input matrix and vector to a specific kernel. The kernel that the system selects according to rules is the fastest kernel for the particular dimensions of the input matrix and vector. The system may then perform the GEMV operation using the selected best kernel (operation 310).

Performance Test Results

FIG. 4A-4B presents Table 3 which shows the performance of GEMV kernels in GFLOPS. The Smart GEMV testing technique and the selected kernels were run on Nvidia's GeForce GTX 580 GPU. All test matrices are in row-major order without any storage padding. Table 3 shows the performance of the best GEMV kernels of each type, including the GEMV kernels with transposition in MAGMA and cuBLAS, {1B1R, ConstN, VarN} kernels described earlier, and the Smart kernel, which simply takes the maximum speed of the three. The performance of a kernel is measured in GFLOPS ($10^9$ floating-point operations per second), and the parameters are $M=10^6$ and $N \in [2, 1024]$. The GFLOPS performance of the fastest kernel type E {1B1R, ConstN, VarN} for $N \in [2, 48]$ is shown in bold font.

As shown in Table 3, ConstN kernels are the fastest for $N \in [2, 14]$. Then the VarN kernels start to outperform ConstN kernels for some values of N (e.g., 15 and 16). For $N \in [15, 37]$, ConstN kernels beat VarN kernels on some 14 values of N's, losing on the other 9. For $N \in [38, 48]$, VarN kernels become the fastest. Table 3 also shows the speedup of Smart GEMV kernels against MAGMA and cuBLAS for $M=10^6$ and $N \in [2, 48]$. The largest speedups are achieved by small values of N, suggesting the more skinny the matrix is, the greater the speedup would be. For example, when N=2, Smart GEMV is 209× and 49.6× faster than MAGMA and cuBLAS, respectively.

FIG. 5A-5B presents Table 4 which shows optimal GEMV kernel types with $\delta_t$ and $\delta_r$ values. Table 4 shows the optimal GEMV kernel type, $\delta_t$ and $\delta_r$ for $M=10^6$ and $N \in [2, 48]$. It can be observed that the optimal kernel type, $\delta_t$ and $\delta_r$ vary from one N to another.

Figure 6:
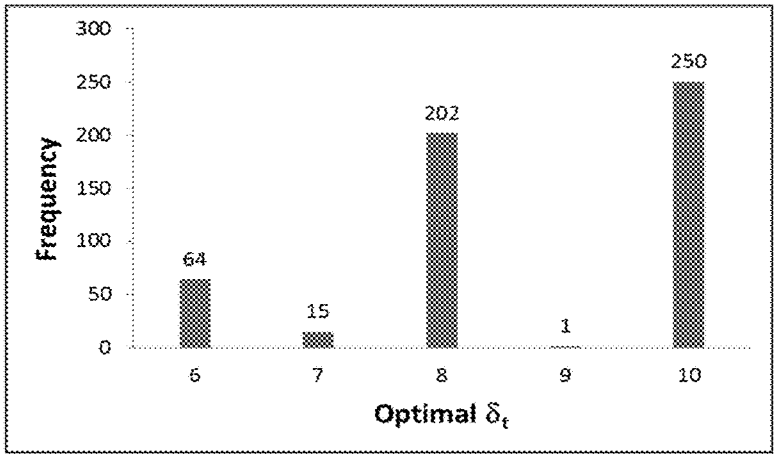
FIG. 6 shows a histogram of 1B1R kernels' optimal $\delta_t$.

According to Table 3, the 1B1R kernels have the second worst performance, only faster than MAGMA. This is because they are designed for N's that are considerably larger than 32, the size of a warp. However, as N increases, so is the speed of these 1B1R kernels. Of the 1,023 different values of $N \in [2, 1024]$ tested, 1B1R is actually faster than both ConstN and VarN kernels on 532 different values of N, winning 52% (=532/1,023) of the times. FIG. 6 shows a histogram 600 of the optimal thread-factor $\delta_t$ when 1B1R is the fastest. As can be seen, the optimal $\delta_t$ that occurs with the highest frequency is 10 (i.e., 160 threads per block), which only accounts for 47% (=250/532) of the optimal cases in FIG. 6. Recall MAGMA uses constantly 128 threads per block in its GEMV kernel with transposition, which can be seen as a special case of the 1B1R kernel with $\delta_t=8$, but only 38% (=202/532) of the 1B1R kernels have an optimal $\delta_t$ of 8. This may also (partially) explain why 1B1R is, on average, 24% faster than MAGMA in Table 3, despite the fact that both use similar strategies of assigning an entire thread block to process a single row of matrix A. For N's that are larger than 1024, experiments on Nvidia GeForce GTX580 show that $\delta_t=8$ is indeed the safest choice, if it must be fixed. Thus, one may add a default rule to the Smart GEMV rule database that prescribes the use of the 1B1R kernel with $\delta_t=8$ and $\delta_r=1$ for N>1024. For example, such a rule may be written as follows:

*→1B1R, 8, 1 where the * symbol in the left-hand side is reserved for values of N greater than the largest N (e.g., 1024) that the database has an explicit rule for. In actual implementations, however, one may use a special value such as 0 to represent all such untested N's.

Figure 7:
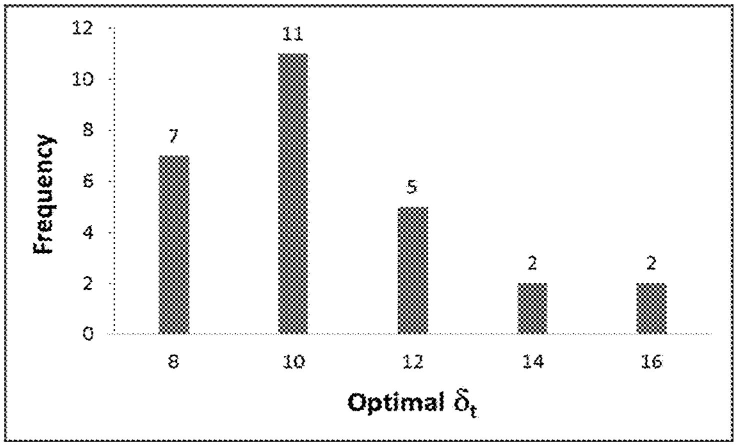
FIG. 7 shows a histogram of ConstN kernels' optimal $\delta_r$.

As shown in Table 3, ConstN kernels are the best for small N's, which are particularly important for GEMV operations involving tall-and-skinny matrices. Of the N's tested, ConstN kernels beat the others on $N \in [2, 14] \cup [17, 25] \cup [33, 37]$. Thus, one only needs to instantiate the corresponding ConstN kernels for these 27 different N's to cover all the cases. FIG. 7 shows a histogram 700 of the ConstN kernels' optimal $\delta_t$ for these 27 ConstN kernels. As can be observed, $\delta_t=10$ (i.e., 160 threads per block) occurs with the highest frequency, which accounts for 41% (=11/27) of the optimal cases in FIG. 7.

Figure 8:
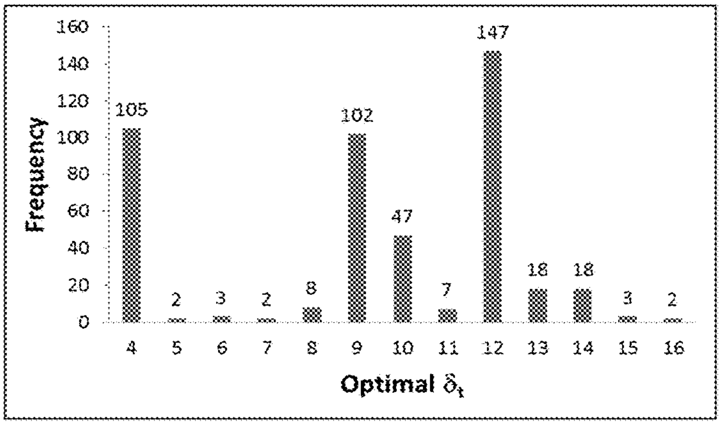
FIG. 8 shows a histogram of VarN kernels' optimal $\delta_r$.

As can be seen from the trend in Table 3, VarN kernels become increasingly more competitive as N increases. Of the 1,023 different values of $N \in [2, 1024]$ tested, VarN outperforms the 1B1R and ConstN kernels on 464 different values of N, winning 45% (=464/1,023) of the times. FIG. 8 shows a histogram 800 of the optimal $\delta_t$ for these 464 optimal VarN kernels. Although $\delta^t=12$ (i.e., 192 threads per block) has the highest frequency, it only accounts for 32% (=147/464) of the optimal cases in FIG. 8.

What can be consistently observed from all the experimental results so far is that a single fixed kernel type, with a constant $\delta_t$ or $\delta_r$, cannot optimize GEMV performance for all possible values of N. This underscores the importance of using the Smart GEMV testing and selection strategies outlined in this disclosure to reduce the variation in GEMV performance.

FIG. 9A-9B presents Table 5 showing maximum over minimum speed for same-type GEMV kernels. To further demonstrate the performance difference, Table 5 shows the ratio of the maximum over minimum speed of GEMV kernels for $M=10^6$ and $N \in [2, 48]$, computed between kernels of the same type. For example, the first cell "1.30×" under the 1B1R column means the fastest 1B1R kernel is 130% the speed of the slowest 1B1R kernel, for N=2. To make the comparison more meaningful, only those $\delta_t$ and $\delta_r$ that have resulted in one or more optimal kernels are used. Thus, for 1B1R kernels, only $\delta_t \in [6, 10]$ are used (as found in the x-axis of FIG. 6); for ConstN kernels, only $\delta_t \in \{8, 10, 12, 14, 16\}$ are used (as found in the x-axis of FIG. 7); and for VarN kernels, only $\delta_t \in [4, 16]$ are used (as found in the x-axis of FIG. 8). In addition, $\delta_r \equiv 1$ is used for all 1B1R and VarN kernels, as it optimizes their performance; whereas $\delta_r \in \{1, 2, 4\}$ are used for ConstN kernels, since each of these three $\delta_r$ values has resulted in one or more optimal ConstN kernels.

Because kernels with clearly sub-optimal $\delta_t$ and $\delta_r$ are not included in the comparison, this ensures even the slowest GEMV kernel is reasonably fast among kernels of the same type. Thus, Table 5 shows the performance improvement that is realized by picking the best $\delta_t$ and $\delta_r$ for different values of N, for each type of kernels.

Figure 10:
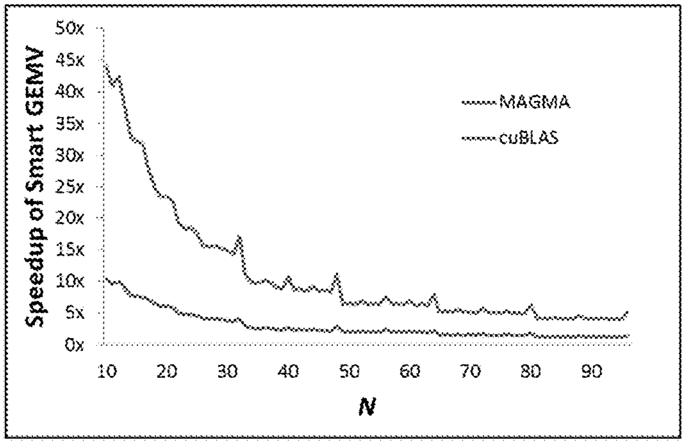
FIG. 10 presents a chart showing the speedup against MAGMA and cuBLAS.

FIG. 10 presents a chart 1000 showing the speedup of Smart GEMV kernels against MAGMA and cuBLAS for $N \in [10, 96]$. For N=96, Smart GEMV is 5.1× and 1.5× faster than MAGMA and cuBLAS, respectively. On average, however, Smart GEMV is 18.9× and 4.8× faster than MAGMA and cuBLAS, for $N \in [2, 96]$.

Figure 11:
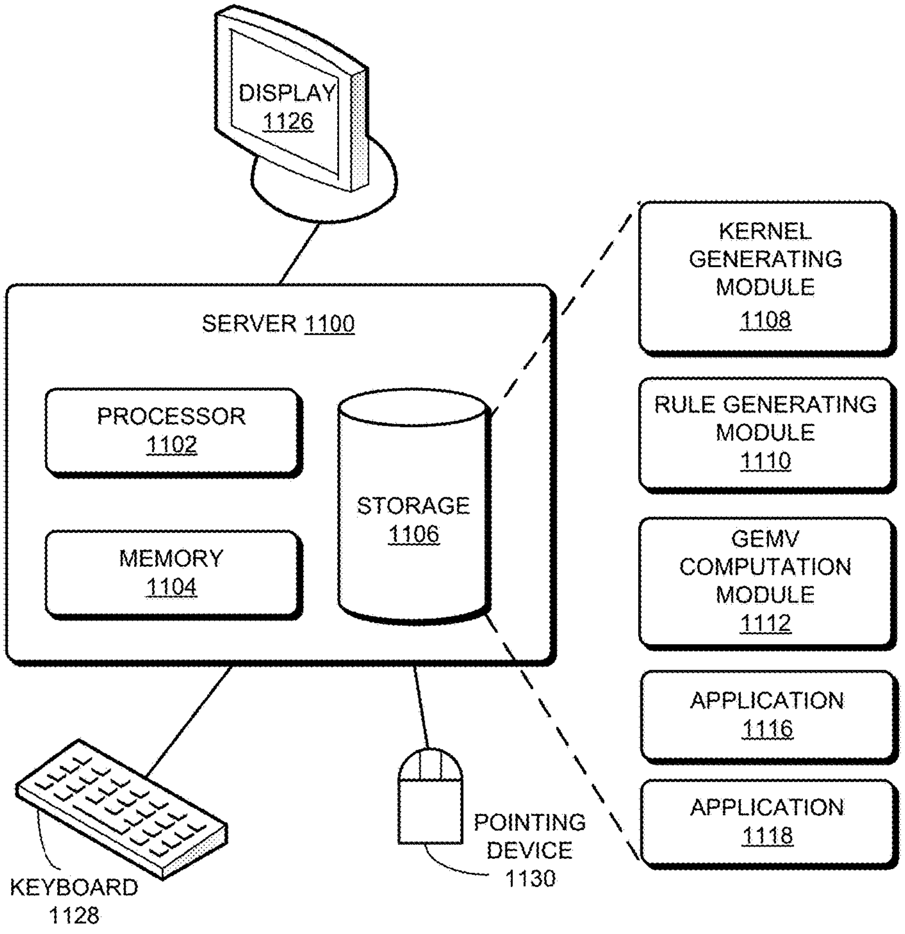
FIG. 11 presents an exemplary GEMV server, in accordance with an embodiment of the present invention.

FIG. 11 presents an exemplary GEMV server 1100, in accordance with an embodiment of the present invention. In FIG. 11, server 1100 includes a processor 1102, a memory 1104, and a storage device 1106. Storage device 1106 stores programs to be executed by processor 1102. Specifically, storage device 1106 stores a kernel generating module 1108, a rule generating module 1110, and a GEMV computation module 1112, as well as other applications, such as applications 1116 and 1118.

Kernel generating module 1108 may generate kernels, including constant-N GEMV kernels and variable-N GEMV kernels. The system may generate constant-N variable-rows GEMV kernels and variable-N variable-rows GEMV kernels. The system may generate constant-N variable-threads GEMV kernels, and variable-N variable-threads GEMV kernels. The system may also generate variable-threads-rows GEMV kernels. This may include ConstN kernels (e.g., constant-N variable-threads-rows GEM V kernels), and VarN kernels (e.g., variable-N variable-threads-rows GEMV kernels). The system may also generate 1B1R variable-thread GEMV kernels.

Rule generating module 1110 may test kernels to determine the best kernels for particular parameter combinations of matrices and vectors and generate rules to select the best kernels for performing GEMV operations. GEMV computation module 1112 may select the best kernel according to the rules and the dimensions of the matrices and vectors and perform GEMV operations on input matrices and vectors. During operation, kernel generating module 1108, rule generating module 1110, and GEMV computation module 1112 are loaded from storage device 1106 into memory 1104 and then executed by processor 1102. While executing the program, processor 1102 performs the aforementioned functions. Server 1100 may be coupled to an optional display 1126, a keyboard 1128, and a pointing device 1130.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for performing a general matrix-vector multiplication (GEMV) operation on a graphics processing unit (GPU), comprising:
- generating a set of kernels that includes at least one of a variable-N GEMV kernel and a constant-N GEMV kernel, wherein a respective kernel of the set of kernels is a function compiled for execution on the GPU;
- maintaining a set of rules, wherein a respective rule of the set of rules includes a mapping between a set of dimensional parameters, which includes a number of rows of a matrix and a number of rows of a vector, and a corresponding kernel from the set of kernels, wherein the mapping indicates that the corresponding kernel can perform the GEMV operation faster than any other kernel in the set of kernels for the set of dimensional parameters in the mapping;
- receiving data representing at least a matrix and a vector;
- determining a first set of dimensional parameters associated with the matrix and the vector;
- loading a kernel from the set of kernels on the GPU for performing the GEMV operation on the GPU, which involves looking up the first set of dimensional parameters in the set of rules; and
- executing the loaded kernel on the GPU using the matrix and the vector as parameters, thereby performing the GEMV operation on the matrix and the vector.

2. The method of claim 1, wherein the set of kernels includes a variable-rows GEMV kernel, wherein the variable-rows GEMV kernel is one of: a variable-N variable-rows GEMV kernel and a constant-N variable-rows GEMV kernel; and
- wherein the method further comprises:
- generating the variable-rows GEMV kernel to perform GEMV operations for all N columns of a matrix A by performing operations that involve:
  - loading, by a thread block, a $TB_r \times b$ sub-matrix of the matrix A and a b×1 sub-vector of a vector x to shared memory using coalesced global-memory reads;
  - multiplying, by each thread of the thread block, $\delta_r$ rows of the $TB_r \times b$ sub-matrix of the matrix A with the b×1 sub-vector of the vector x stored in shared memory; and
  - writing multiplication results to a $TB_r \times 1$ sub-vector of a vector y using coalesced global-memory writes, wherein the thread block processes a number of rows $TB_r$ of the matrix A, $TB_r$ is equal to a multiple of a row-factor value, and b is a block size.

3. The method of claim 1, wherein the set of kernels includes a variable-threads GEMV kernel, wherein the variable-threads GEMV kernel is one of: a variable-N variable-threads GEMV kernel and a constant-N variable-threads GEMV kernel; and
- wherein the method further comprises:
- generating the variable-threads GEMV kernel to perform GEMV operations with a number of threads in a thread block equal to a multiple of a thread-factor value.

4. The method of claim 1, wherein the set of kernels includes one or more constant-N variable-threads-rows GEMV kernels generated with template parameters indicating a row-factor $\delta_r$, a thread-factor $\delta_t$, and N columns of a matrix.

5. The method of claim 1, wherein the set of kernels includes one or more variable-N variable-threads-rows GEMV kernels generated with template parameters indicating a row-factor $\delta_r$ and a thread-factor $\delta_t$.

6. The method of claim 1, wherein the set of kernels includes a 1B1R variable-thread GEMV kernel and wherein the method further comprises:
- generating the 1B1R variable-thread GEMV kernel to perform GEMV operations with a thread block processing a single row of a matrix A, which involves each thread of the thread block multiplying one in every $16\delta_t$ elements of the single row with a corresponding element of a vector x until an end of the single row while keeping a running sum, with the running sums of all threads added up in shared memory to compute a total sum, and writing a final result including the total sum to a vector y.

7. The method of claim 1, further comprising generating the set of rules, which involves:
- determining, for a respective kernel of the set of kernels, computation times for performing GEMV operations for a set of dimensional parameters associated with a matrix and a vector combination;
- identifying a kernel for which the computation time is faster than any other kernel for the set of dimensional parameters; and adding, to the set of rules, a rule comprising a mapping between the set of dimensional parameters and the kernel.

8. The method of claim 7, further comprising:

using a constant parameter combined with other variable parameters to reduce a number of tests required.

9. The method of claim 7, further comprising:

performing non-uniform sampling density along M and N axes of a two-dimensional testing space to obtain a set of <M, N> test pairs.

10. The method of claim 1, further comprising storing the set of rules in a rule database that is accessible from multiple homogeneous GPUs, thereby allowing a respective GPU to select a kernel based on a given set of dimensional parameters.

11. The method of claim 1, further comprising:

in response to determining that a lookup for the first set of dimensional parameters in the set of rules has failed, performing a lookup in the set of rules for finding a rule associated with a second set of dimensional parameters within one or more predetermined thresholds of the first set of dimensional parameters.

12. The method of claim 11, further comprising using a non-negative parameter distance function to determine a proximity of rules to select the kernel from the set of kernels for loading on the GPU.

13. The method of claim 1, wherein loading the kernel further comprises selecting the kernel in a rules database based on the number of rows of the vector.

14. The method of claim 1, further comprising:

performing a testing operation to determine that the kernel is faster than other kernels for performing the GEMV operation on the matrix and the vector; and including a rule that maps the set of dimensional parameters to the kernel in the set of rules.

15. The method of claim 1, wherein the matrix is stored in a row-major order without storage padding or in a column-major order without storage padding in a memory associated with the GPU.

16. The method of claim 1, further comprising:

using multiple dimensions of a thread grid of the GPU to encode rows or columns of a sub-matrix assigned to a thread block, thereby increasing a number of rows the sub-matrix.

17. A non-transitory computer-readable storage medium storing instructions which when executed by a computer cause the computer to perform a method for performing a general matrix-vector multiplication (GEMV) operation on a graphics processing unit (GPU), the method comprising:

generating a set of kernels that includes at least one of a variable-N GEMV kernel and a constant-N GEMV kernel, wherein a respective kernel of the set of kernels is a function compiled for execution on the GPU;

maintaining a set of rules, wherein a respective rule of the set of rules includes a mapping between a set of dimensional parameters, which includes a number of rows of a matrix and a number of rows of a vector, and a corresponding kernel from the set of kernels, wherein the mapping indicates that the corresponding kernel can perform the GEMV operation faster than any other kernel in the set of kernels for the set of dimensional parameters in the mapping;

receiving data representing at least a matrix and a vector;

determining a first set of dimensional parameters associated with the matrix and the vector;

loading a kernel from the set of kernels on the GPU for performing the GEMV operation on the GPU, which involves looking up the first set of dimensional parameters in the set of rules; and executing the loaded kernel on the GPU using the matrix and the vector as parameters, thereby performing the GEMV operation on the matrix and the vector.

18. The storage medium of claim 17, wherein the set of kernels includes a variable-rows GEMV kernel, wherein the variable-rows GEMV kernel is one of: a variable-N variable-rows GEMV kernel and a constant-N variable-rows GEMV kernel; and the wherein method further comprises:

generating the variable-rows GEMV kernel to perform GEMV operations for all N columns of a matrix A by performing operations that involve:

loading, by a thread block, a $TB_r \times b$ sub-matrix of the matrix A and a b×1 sub-vector of a vector x to shared memory using coalesced global-memory reads;

multiplying, by each thread of the thread block, $\delta_r$ rows of the $TB_r \times b$ sub-matrix of the matrix A with the b×1 sub-vector of the vector x stored in shared memory; and writing multiplication results to a $TB_r \times 1$ sub-vector of a vector y using coalesced global-memory writes, wherein the thread block processes a number of rows $TB_r$ of the matrix A, $TB_r$ is equal to a multiple of a row-factor value, and b is a block size.

19. The storage medium of claim 17, wherein the set of kernels includes a variable-threads GEMV kernel, wherein the variable-threads kernel is one of: a variable-N variable-threads GEMV kernel and a constant-N variable-threads GEMV kernel; and wherein the method further comprises:

generating the variable-threads GEMV kernel to perform GEMV operations with a number of threads in a thread block equal to a multiple of a thread-factor value.

20. A computing system comprising:

one or more processors;

a graphics processing unit (GPU);

a memory; and a non-transitory computer-readable medium coupled to the one or more processors storing instructions stored that, when executed by the one or more processors, cause the computing system to perform a method for performing a general matrix-vector multiplication (GEMV) operation on the GPU, the method comprising:

generating a set of kernels that includes at least one of a variable-N GEMV kernel and a constant-N GEMV kernel, wherein a respective kernel of the set of kernels is a function compiled for execution on the GPU;

maintaining a set of rules, wherein a respective rule of the set of rules includes a mapping between a set of dimensional parameters, which includes a number of rows of a matrix and a number of rows of a vector, and a corresponding kernel from the set of kernels, wherein the mapping indicates that the corresponding kernel can perform the GEMV operation faster than any other kernel in the set of kernels for the set of dimensional parameters in the mapping;

receiving data representing at least a matrix and a vector;

determining a first set of dimensional parameters associated with the matrix and the vector;

loading a kernel from the set of kernels on the GPU for performing the GEMV operation on the GPU, which involves looking up the first set of dimensional parameters in the set of rules; and executing the loaded kernel on the GPU using the matrix and the vector as parameters, thereby performing the GEMV operation on the matrix and the vector.

* * * * *